(12) United States Patent
Cheng et al.

(10) Patent No.: US 10,538,198 B1
(45) Date of Patent: Jan. 21, 2020

(54) WIRELESS SMART MAT

(71) Applicants: Chia-Pao Cheng, Hsinchu (TW);
Pao-Lin Guo, Hsinchu (TW); An-Tsun Teng, Hsinchu (TW)

(72) Inventors: Chia-Pao Cheng, Hsinchu (TW);
Pao-Lin Guo, Hsinchu (TW); An-Tsun Teng, Hsinchu (TW)

(73) Assignee: ZEALIO ELECTRONICS CO., LTD., Hsinchu (TW)

( * ) Notice: Subject to any disclaimer, the term of this patent is extended or adjusted under 35 U.S.C. 154(b) by 0 days.

(21) Appl. No.: 16/411,144

(22) Filed: May 14, 2019

(51) Int. Cl.
| | |
|---|---|
| *B60Q 3/74* | (2017.01) |
| *G09F 19/22* | (2006.01) |
| *H05B 33/08* | (2006.01) |
| *B60Q 3/217* | (2017.01) |
| *H05B 37/02* | (2006.01) |
| *B60N 3/04* | (2006.01) |

(52) U.S. Cl.
CPC ............. *B60Q 3/745* (2017.02); *B60N 3/048* (2013.01); *B60Q 3/217* (2017.02); *G09F 19/228* (2013.01); *H05B 33/0854* (2013.01); *H05B 37/0227* (2013.01); *H05B 37/0272* (2013.01)

(58) Field of Classification Search
CPC ............ H05B 33/0857; H05B 33/0845; H05B 33/0842; H05B 33/086; H05B 37/02; H05B 37/0272; H05B 37/029; B60Q 2300/41; B60Q 2300/42
USPC .......... 315/307; 345/207, 212, 2.1, 55, 8, 87
See application file for complete search history.

(56) References Cited

U.S. PATENT DOCUMENTS

2017/0181255 A1* 6/2017 Jeremy .............. H05B 37/0272

* cited by examiner

*Primary Examiner* — Wei (Victor) Y Chan
(74) *Attorney, Agent, or Firm* — Che-Yang Chen; Law Office of Scott Warmuth

(57) ABSTRACT

A wireless smart mat receives a sensing signal detected by a transmitting end, and comprises a foot mat, and a display mat unit comprising a frame with a recess to form an accommodating portion for accommodating a power supply module and a magnetic element; a backlight module disposed in the recess and comprising at least one circuit board electrically connected to the power supply module and provided with light-emitting members; at least one magnetic sensing module disposed on the circuit board; a first wireless transmission and receiving module for receiving the sensing signal; a gravity sensing module for detecting a change in acceleration and generating a voltage signal; a first control module for turning on and off the backlight module; a panel accommodated in the recess; and a bottom plate assembled on another side of the frame. The display mat unit is installed in the foot mat.

20 Claims, 12 Drawing Sheets

WIRELESS SMART MAT

BACKGROUND OF THE INVENTION

Field of Invention

The present invention relates to a wireless smart mat, and more particularly to a wireless smart mat which can greatly improve safety, and can achieve installation convenience, thin design and effect of energy-saving.

Related Art

At present, the car mat technology with illumination function on the market usually needs to be electrically connected to the vehicle power supply. The installation is very complicated and difficult and has safety concerns, the design makes the car mat relatively heavy and the volume relatively large, and cannot be compatible with any type of foot mat.

In addition, the welcome pedals commonly available on the market control the opening and closing of the light (such as an illuminating lamp or a light-emitting diode, etc.) by using a magnetic switch, an infrared switch or an ultrasonic switch.

In the structure controlled by the magnetic switch, since the magnet is disposed in the vehicle door, the pedal is disposed at a low position on the vehicle relative to the opened vehicle door, and switching on or off is achieved by magnetic induction through the two components. Although more electric power is saved, the magnet is not easy to install, and the position can be shifted relative to the position of the inductive switch, thereby causing misalignment of induction.

In the structure controlled by the infrared switch or the ultrasonic switch, since both of them need to be supplied with power source from the vehicle power supply, wires for connection between products are required in the vehicle, and the installation becomes very complicated and difficult and also has safety concerns.

Therefore, whether it is the vehicle mat or the welcome pedal with illumination function on the market, the installation requires electrical connection to the vehicle power supply through wires, which can easily cause drawbacks and problems of complicated installation and safety concerns, and the overall sizes of the foot mat and the welcome pedal are large and thin design can not be achieved.

Therefore, how to solve the above problems and drawbacks in the prior art is what the inventor of the present invention and relevant manufacturers engaged in this industry are eager to research and make improvement.

SUMMARY OF THE INVENTION

Therefore, in order to effectively solve the above problems, a main object of the present invention is to provide a wireless smart mat that greatly improves safety.

A secondary object of the present invention is to provide a wireless smart mat that greatly enhances the convenience of installation.

A secondary object of the present invention is to provide a wireless smart mat that can achieve a thinning effect.

A secondary object of the present invention is to provide a wireless smart mat with energy-saving effects.

In order to achieve the above objects, the present invention provides a wireless smart mat, which can receive a sensing signal detected by a transmitting end. The wireless smart mat comprises a display mat unit and a foot mat. The display mat unit comprises a frame, a backlight module, at least one magnetic sensing module, a first wireless transmission and receiving module, a gravity sensing module, a first control module, a panel and a bottom plate. One side of the frame has a recess, an accommodating portion is correspondingly disposed in the recess, and the accommodating portion is accommodated with a power supply module and a magnetic element. The backlight module is correspondingly accommodated in the recess, the backlight module comprises at least one circuit board electrically connected to the power supply module, and the circuit board is provided with a plurality of light-emitting members. The magnetic sensing module is correspondingly disposed on the circuit board and set in a alternating manner with the magnetic element. The first wireless transmission and receiving module is disposed on the circuit board for receiving the sensing signal of the transmitting end. The gravity sensing module is disposed on the circuit board for detecting a change in acceleration and generating a voltage signal. The first control module is disposed on the circuit board and electrically connected to the backlight module, the magnetic sensing module, the first wireless transmission and receiving module, and the gravity sensing module, and the first control module turns on and turns off the backlight module according to the sensing signal and the voltage signal. The panel is accommodated in the recess and correspondingly disposed above the backlight module. The bottom plate is assembled on another side of the frame and correspondingly covered on the accommodating portion. The foot mat has a receiving portion, and the display mat unit is correspondingly installed in the receiving portion.

The transmitting end further has a sensing module, a second wireless transmission and receiving module and a second control module. The sensing module is used for detecting the sensing signal and transmitting the sensing signal to the second control module. After the second control module generates a control signal according to the sensing signal and transmits the control signal to the second wireless transmission and receiving module, the second wireless transmission and receiving module transmits the control signal to the first wireless transmission and receiving module.

It should be explained that the foot mat of the present invention is correspondingly installed on a bottom of a vehicle, and the transmitting end can be disposed in a welcome pedal, or on a door of the vehicle, or on a door frame of the vehicle.

With the design of the structure of the present invention, when the door of the vehicle is opened, the opening of the door is detected by the sensing module of the transmitting end, and the sensing signal is detected, and the sensing signal is transmitted to the second control module. The second control module generates the control signal according to the sensing signal, and transmits the control signal to the second wireless transmission and receiving module, and then the second wireless transmission and receiving module transmits the control signal to the first wireless transmission and receiving module of the display mat unit. The first wireless transmission and receiving module receives the control signal and transmits the control signal to the first control module, and the first control module turns on the backlight module according to the control signal. Therefore, with the present invention, the wireless smart mat can automatically turn on the backlight module when the door is opened, and turn off the backlight module when the door is closed. In this way, drawbacks and problems of complicated installation and safety concerns caused by the conventional foot mat and transmitting end must be electrical connected to the vehicle power supply through wires are eliminated. The present invention replaces the conventional way of wire connection with the first wireless transmission and receiving module of the wireless smart mat and the second wireless transmission and receiving module of the transmitting end, thereby greatly improving safety and installation convenience, and further achieving the effect of thin design.

In addition, through the gravity sensing module in the display mat unit, when the vehicle is in a stationary state for a long time, the acceleration change detected by the gravity sensing module is 0, and the first control module turns off the backlight module and the first wireless transmission and receiving module according to the voltage signal, so that the wireless smart mat is in a power saving mode when the vehicle is in a stationary state, and only the gravity sensing module is turned on to detect the behavior state of the vehicle. In addition, when the vehicle is in a driven state, the acceleration change detected by the gravity sensing module is greater than 0, and the first control module turns off the backlight module and the first wireless transmission and receiving module according to the voltage signal, so that the wireless smart mat is in a sleep mode when the vehicle is in a driven state, and only the gravity sensing module is turned on to detect the behavior state of the vehicle. When the door of the vehicle is opened or closed, the acceleration sensed by the gravity sensing module is changed from 0 to greater than 0 (i.e. the gravity sensing module is from a stationary state to a vibration state), and the voltage signal sent by the gravity sensing module is transmitted to the first control module. The first control module controls the first transmission and receiving module according to the voltage signal to turn on for a period of time to receive the control signal of the transmitting end. At this time, the backlight module can be turned on according to the control signal, and thus the unnecessary modules can be turned off regardless of the vehicle in a stationary state or in a driven state, so that the unnecessary modules (the backlight module, the first transmission and receiving module) generate a power saving mode or a sleep mode, thereby achieving a significant energy-saving effect.

In addition, the display mat unit of the wireless smart mat further has a timing module disposed on the circuit board and electrically connected to the first control module and the backlight module. When the door of the vehicle has been opened for too long, the backlight module can be automatically turned off by the timing module to achieve a better power saving effect.

DETAILED DESCRIPTION OF THE INVENTION

The above objects and structural and functional features of the present invention will be described in accordance with the preferred embodiments with reference to the accompanying drawings.

Figure 1:
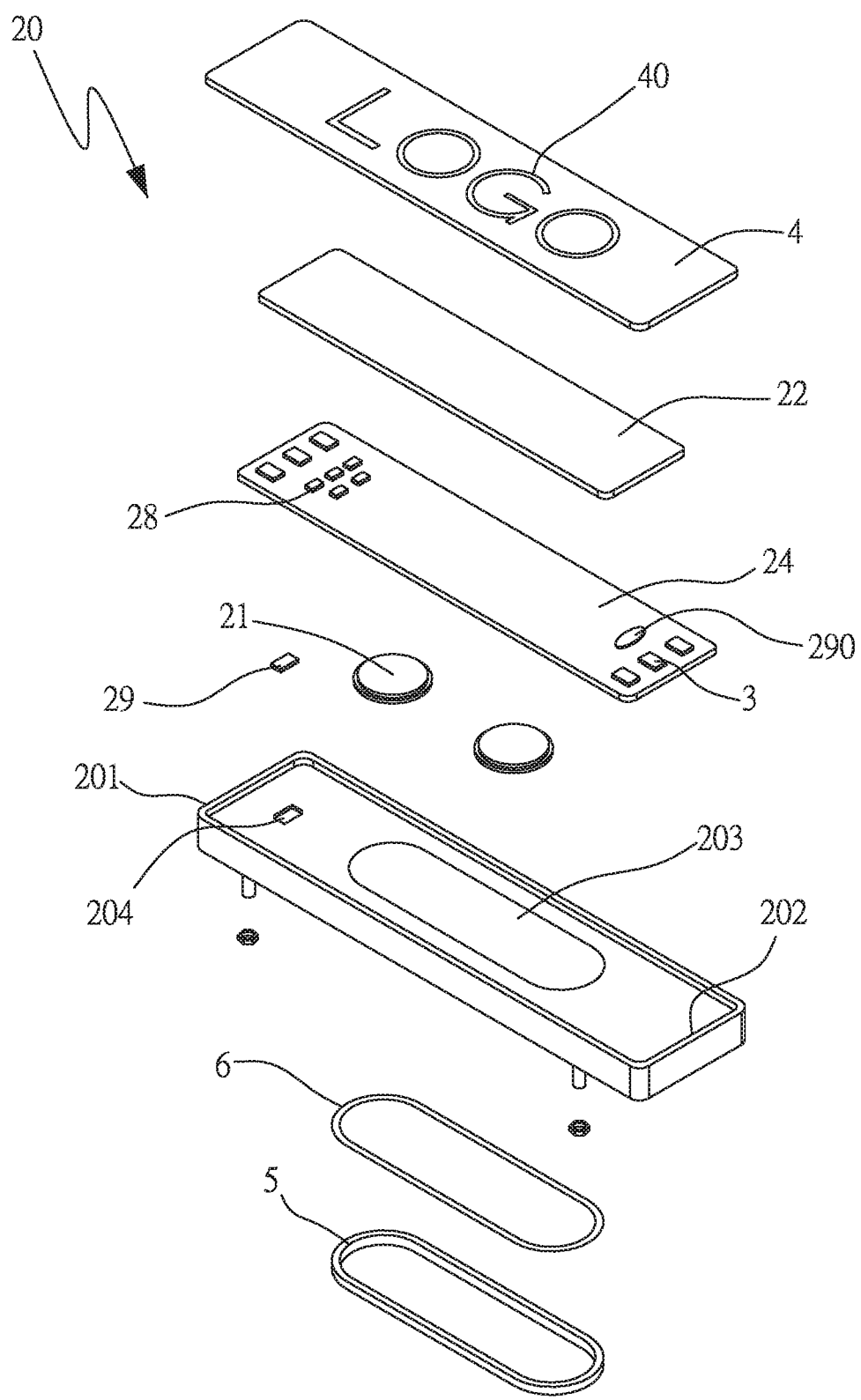
FIG. 1 is an exploded perspective view of a first embodiment of a wireless smart mat of the present invention.
Figure 2:
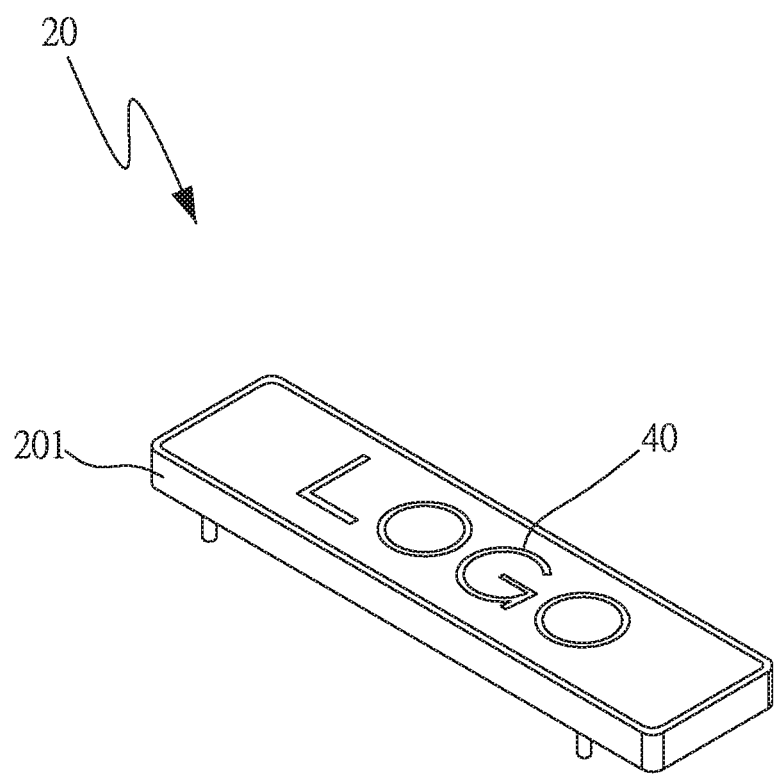
FIG. 2 is a perspective assembled view of the first embodiment of the wireless smart mat of the present invention.
Figure 3:
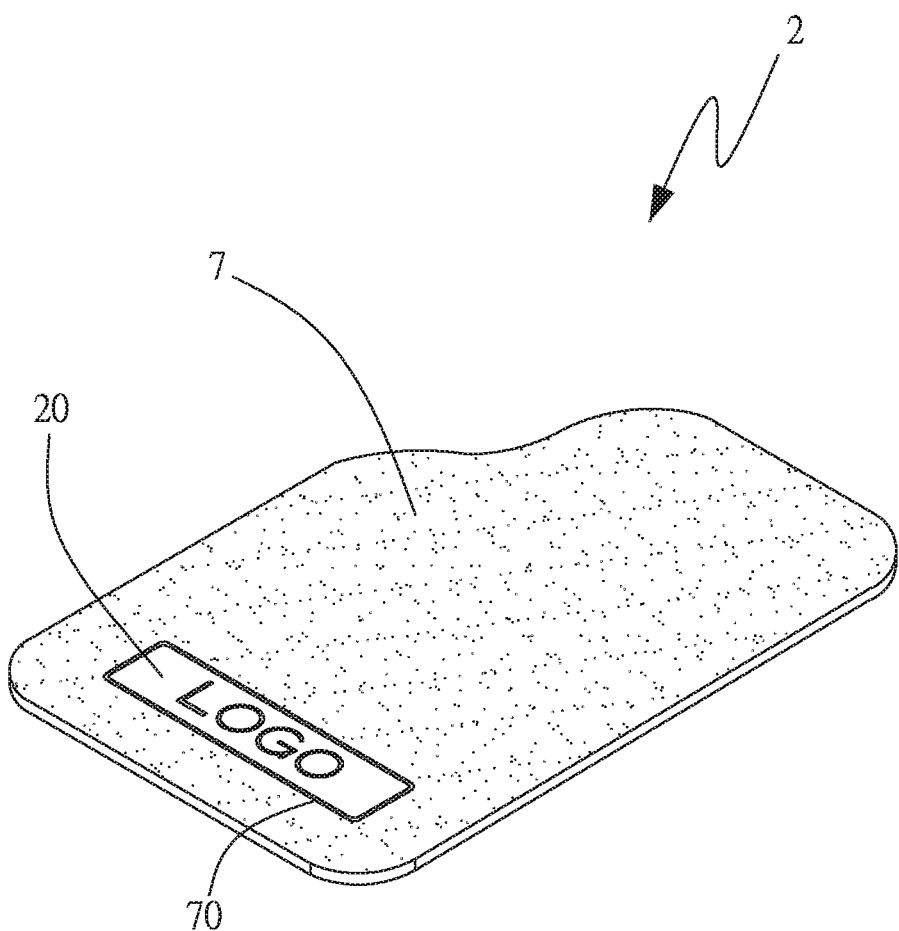
FIG. 3 is a perspective view of a foot mat of the first embodiment of the wireless smart mat of the present invention.

Please refer to FIGS. 1, 2 and 3, which are exploded perspective view, perspective assembled view of a first embodiment and perspective view of a foot mat of the first embodiment of a wireless smart mat of the present invention. As shown in the figures, a wireless smart mat 2 can receive a sensing signal detected by a transmitting end 8. It should be explained that the transmitting end 8 can be installed in a welcome pedal, on a related position of a vehicle door 90, or on a door frame 91 of a vehicle 9 (please refer to FIG. 12 together), and the wireless smart mat 2 comprises a display mat unit 20 and a foot mat 7. In addition, it should be explained that the foot mat 7 is correspondingly installed on a bottom of the vehicle 9.

Figure 4:
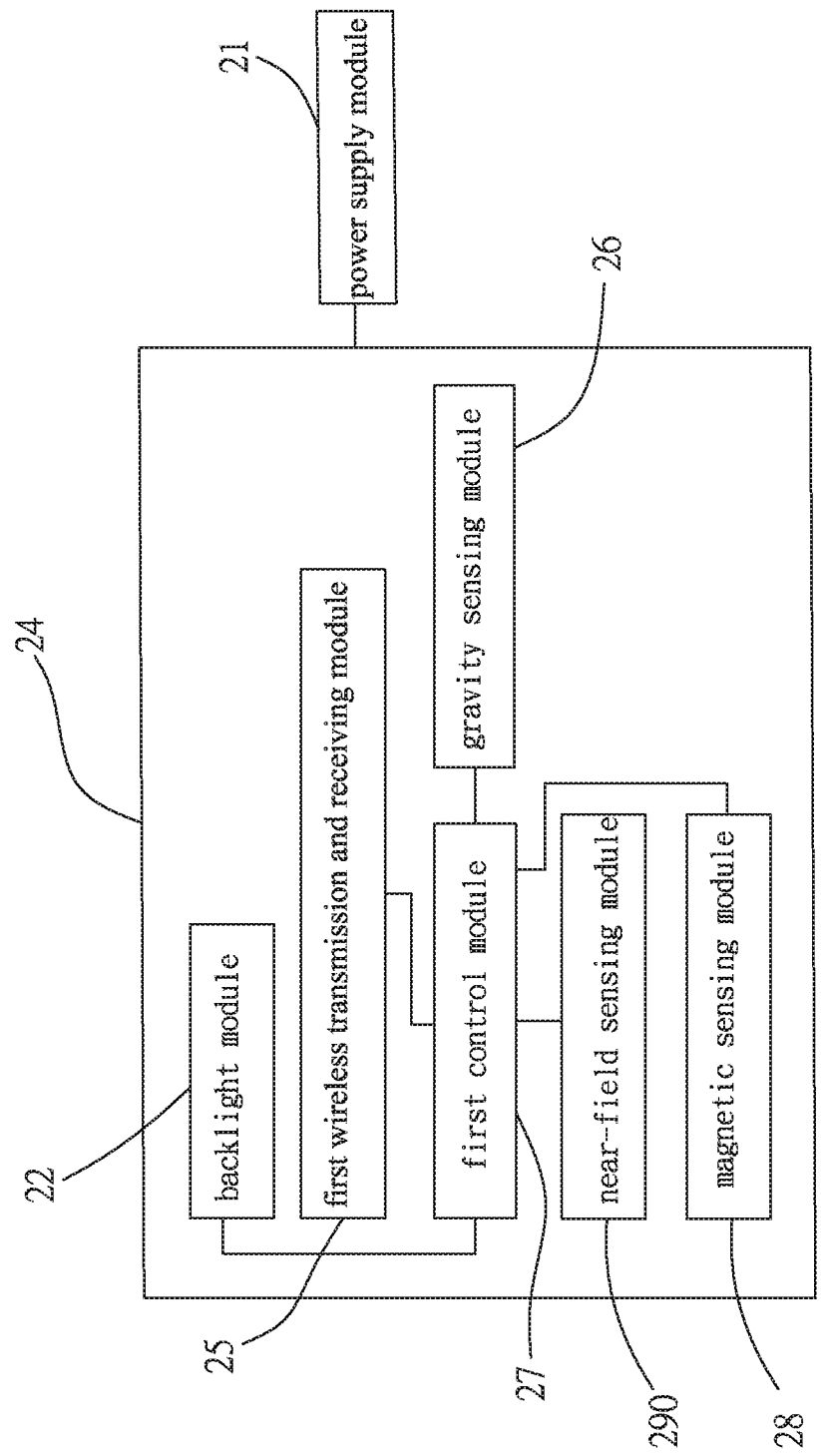
FIG. 4 is a block diagram of a display mat unit of the first embodiment of the wireless smart mat of the present invention.
Figure 5:
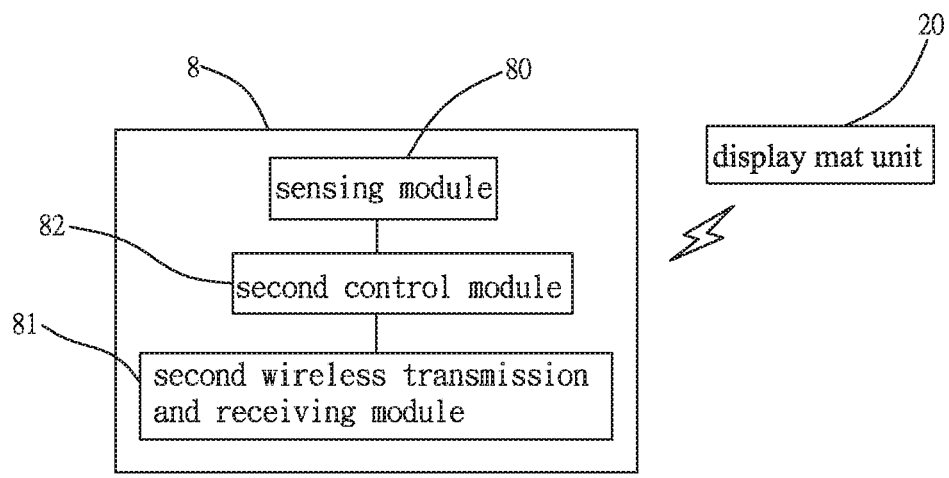
FIG. 5 is a block diagram of the first embodiment of the wireless smart mat of the present invention.
Figure 6:
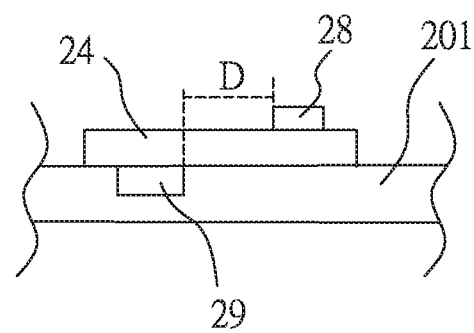
FIG. 6 is a partial schematic view of the first embodiment of the wireless smart mat of the present invention.

Continuing to refer to FIG. 4 and FIG. 5, the display mat unit 20 comprises a frame 201, a backlight module 22, at least one magnetic sensing module 28, a first wireless transmission and receiving module 25, a gravity sensing module 26, a first control module 27, a panel 4 and a bottom plate 5. One side of the frame 201 has a recess 202, and an accommodating portion 203 and a slot 204 are correspondingly disposed at positions of the recess 202. The accommodating portion 203 is correspondingly accommodated with a power supply module 21, and the slot 204 is correspondingly accommodated with a magnetic element 29. The power supply module 21 is used to provide power for each of the components of the display mat unit 20. The backlight module 22 is correspondingly accommodated in the recess 202. The backlight module 22 comprises at least one circuit board 24 electrically connected to the power supply module 21, and the circuit board 24 is provided with a plurality of light-emitting members 3. The light-emitting member 3 can be selected as a light-emitting diode or an organic light-emitting diode. The magnetic sensing module 28 is correspondingly disposed on the circuit board 24 and set in a alternating manner with the magnetic element 29. Please refer to FIG. 6 as well, in other words, a certain corresponding set distance D is between the magnetic sensing module 28 disposed on the circuit board 24 and the magnetic element 29 disposed in the frame 201, and the formula for distance calculation is as follows:

the distance $D=0$ mm+coefficient×(Gauss maximum value−the Gauss value of the magnetic element 29 used for assembly); and wherein the "coefficient" is derived from the test data between a plurality of the magnetic sensing modules 28 and the magnetic element 29.

Figure 7:
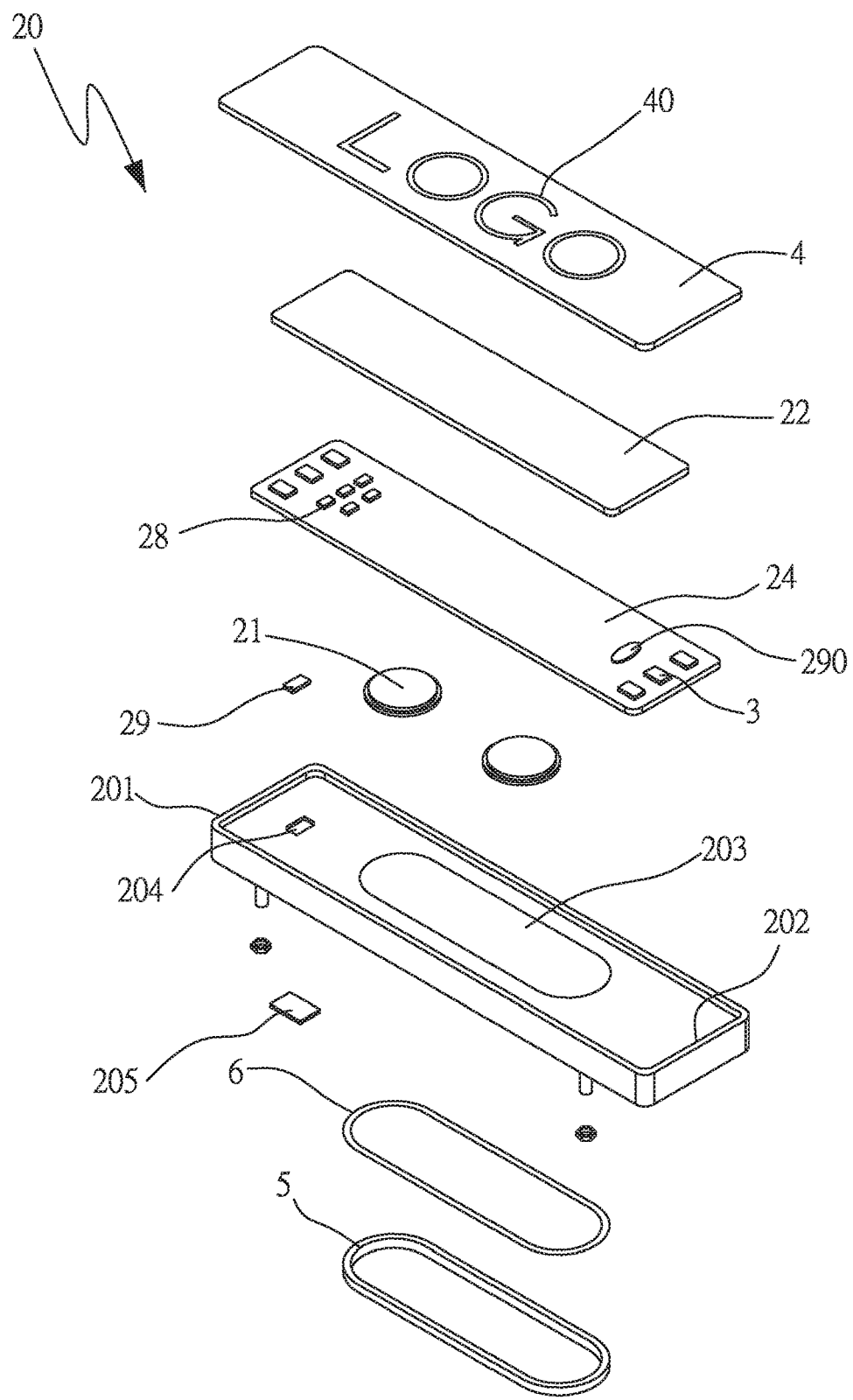
FIG. 7 is a perspective exploded view of a second embodiment of the wireless smart mat of the present invention.
Figure 8:
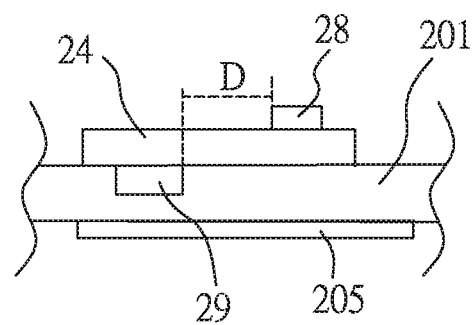
FIG. 8 is a partial schematic view of the second embodiment of the wireless smart mat of the present invention.

Please refer to FIGS. 7 and 8 for perspective exploded and partial schematic view of a second embodiment of the wireless smart mat of the present invention. The differences from the first embodiment are that the frame 201 is further disposed with an iron plate 205 corresponding to a lower side of the slot 204, and the iron plate 205 is disposed corresponding to the magnetic element 29. Further explained, the iron plate 205 is attached under the magnetic element 29, and since the iron plate 205 is affected by the magnetic element 29, the internal magnetic direction is relatively consistent, so that the iron plate 205 is magnetized by the magnetic element 29, and the magnetized iron plate 205 enhances the magnetic field around it, and thus the distance of sensing is greatly increased.

The first wireless transmission and receiving module 25, the gravity sensing module 26, and the first control module 27 are all disposed on the circuit board 24 and electrically connected thereto. The first wireless transmission and receiving module 25 is used for receiving the sensing signal of the transmitting end 8. The gravity sensing module 26 is used for detecting a change in acceleration and generating a voltage signal. The first control module 27, the backlight module 22, the first wireless transmission and receiving module 25 and the gravity sensing module 26 are electrically connected to one another. The first control module 27 turns on or turns off the backlight module 22 according to the sensing signal and the voltage signal. The panel 4 is disposed in the recess 202 and correspondingly disposed on the backlight module 22, and a light-transmitting portion 40 is further formed on the panel 4. The light-transmitting portion 40 is correspondingly disposed on the backlight module 22, so that a light source emitted from the light-emitting members 3 can be transmitted from the light-transmitting portion 40 to the outside.

The bottom plate 5 is assembled on another side of the frame 201 and correspondingly covered on the accommodating portion 203. A waterproof ring 6 is further disposed between the bottom plate 5 and the frame 201. The waterproof ring 6 is installed at a circumferential side of the accommodating portion 203, so that the display mat unit 20 can achieve waterproof effect.

The foot mat 7 has a receiving portion 70, so that the display mat unit 20 can be correspondingly installed in the receiving portion 70, and the installed foot mat 7 can be correspondingly laid at a position of the driver's seat, the front passenger seat or the rear seat in the vehicle 9 where the feet step on.

It should be explained that the transmitting end 8 of this embodiment is described as being installed in the welcome pedal, but is not limited thereto. The transmitting end 8 can also be installed on the vehicle door 90 or the door frame 91 (as described above). As stated above, the welcome pedal further comprises a sensing module 80, a second wireless transmission and receiving module 81, and a second control module 82. The sensing module 80 can be selected as a magnetic proximity switch or a capacitive proximity switch, which replaces the conventional magnet with the change of charge induction, and has inductive effect without the need to install magnet on the vehicle door 90 of the vehicle 9. The sensing of the opening or closing state of the vehicle door 90 by using the sensing module 80 of the welcome pedal is a conventional technique, so it is not described here. The first and second control modules 27 and 82 can be selected as a microcontroller (MCU) or an integrated circuit (IC).

In addition, the display mat unit 20 of the present invention further has a near-field sensing module 290 correspondingly disposed on the circuit board 24 and electrically connected to the first control module 27. The near-field sensing module 290 is used to perform a near-field sensing procedure to sense a near-field distance between the transmitting end 8 and the foot mat 7 to generate a near-field sensing signal. Please refer to FIG. 9 as well, which is a block diagram of the first control module of the display mat unit of the present invention being used to perform an interference procedure of noise mitigation to reduce noise in the near-field sensing signal.

Figure 9:
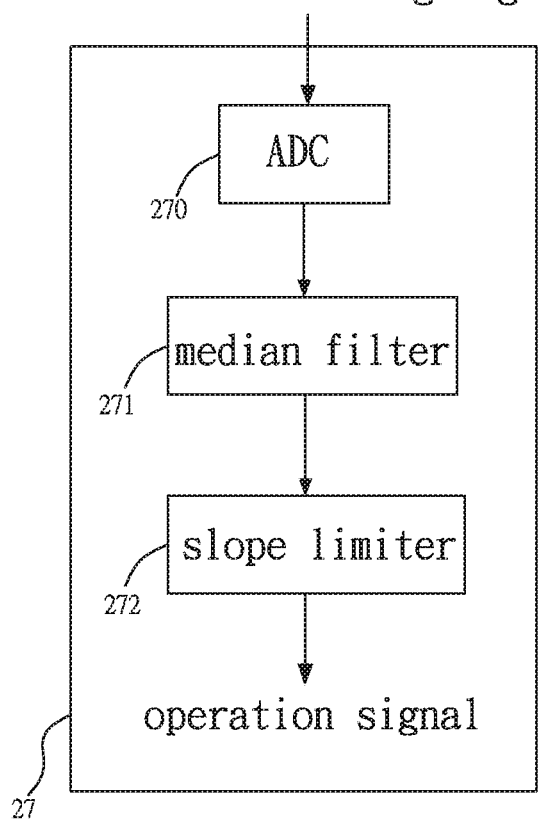
FIG. 9 is a block diagram of the first embodiment of a first control module for performing an interference procedure of noise mitigation of the wireless smart mat of the present invention.

In order to perform the interference procedure of noise mitigation by the first control module 27 of the display mat unit 20, as shown in FIG. 9, the first control module 27 further comprises an analog-to-digital converter 270, a median filter 271, and a slope limiter 272. The median filter 271 is coupled to the analog-to-digital converter 270. The analog-to-digital converter 270 is used for converting the near-field sensing signal into a digital near-field sensing signal. The median filter 271 is used for performing a median filtering operation on the digital near-field sensing signal to filter out a surge noise in the digital near-field sensing signal. The slope limiter 272 is coupled to the analog-to-digital converter 270, and is used for performing a slope limiting operation on the digital near-field sensing signal to filter out a drastic noise in the digital near-field sensing signal. Wherein the first control module 27 generates an operation signal according to results of the median filtering operation and the slope limiting operation, and the interference procedure of noise mitigation comprises the median filtering operation and the slope limiting operation. The so-called median filtering operation refers to selecting the median of the digital near-field sensing signal in each preset time interval; and the slope limiting operation refers to filtering out a portion of the slope beyond a predetermined slope in the signal waveform of the digital near-field sensing signal versus time. The median filtering operation and the slope limiting operation are well known to those of ordinary skill in the art, and will not be further described herein.

Figure 10:
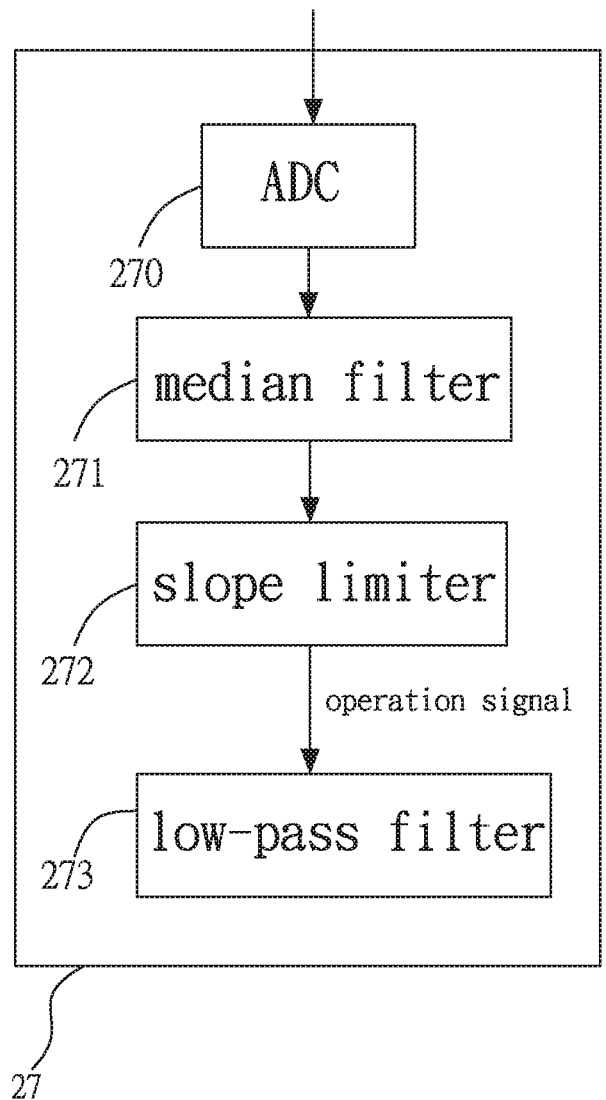
FIG. 10 is a block diagram of the first control module of the wireless smart mat of the present invention comprising a low-pass filter.
Figure 11:
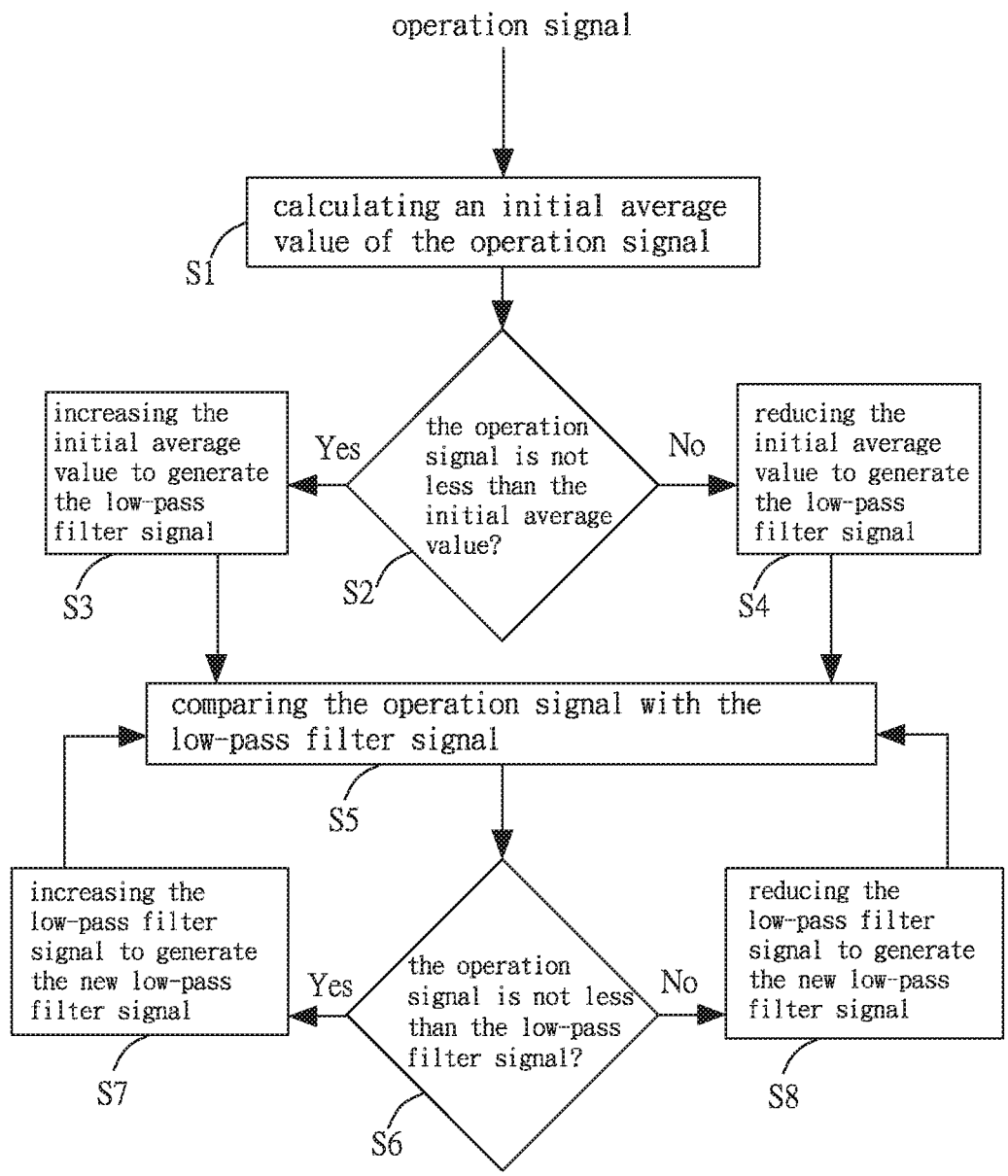
FIG. 11 is a flow chart of steps of a self-learning procedure of the wireless smart mat of the present invention.

Continuing to refer to FIG. 10 and FIG. 11, in order to perform the interference procedure of noise mitigation by the display mat unit 20, the first control module 27 further comprises a low-pass filter 273 for performing a low-pass filtering operation on the operation signal to generate a low-pass filter signal. The low-pass filtering operation has many modes of implementation. In one implementation mode, the low-pass filtering operation comprises a self-learning procedure, wherein the low-pass filter 273 performs the self-learning procedure on the operation signal to achieve low-pass filtering of the operation signal to generate the low-pass filter signal, wherein the self-learning procedure comprises the following steps of:

S1: calculating an initial average value of the operation signal;

S2: comparing the operation signal with the initial average value;

S3: when the operation signal is not less than the initial average value, increasing the initial average value to generate the low-pass filter signal;

S4: when the operation signal is less than the initial average value, reducing the initial average value to generate the low-pass filter signal;

S5: comparing the operation signal with the low-pass filter signal;

S6: checking the comparison result;

S7: when the operation signal is not less than the low-pass filter signal, increasing the low-pass filter signal to generate the new low-pass filter signal;

S8: when the operation signal is less than the low-pass filter signal, reducing the low-pass filter signal to generate the new low-pass filter signal; and S9: repeating the step S5.

Therefore, when the vehicle door 90 is opened or closed, the sensing module 80 transmits the detected sensing signal to the second control module 82, the second control module 82 generates a control signal according to the sensing signal and transmits the control signal to the second wireless transmission and receiving module 81, and the control signal is transmitted to the first wireless transmission and receiving module 25 of the display mat unit 20 by the second wireless transmission and receiving module 81 to inform the foot mat 7 that the current state of the vehicle door 90 is opened or closed.

Figure 12:
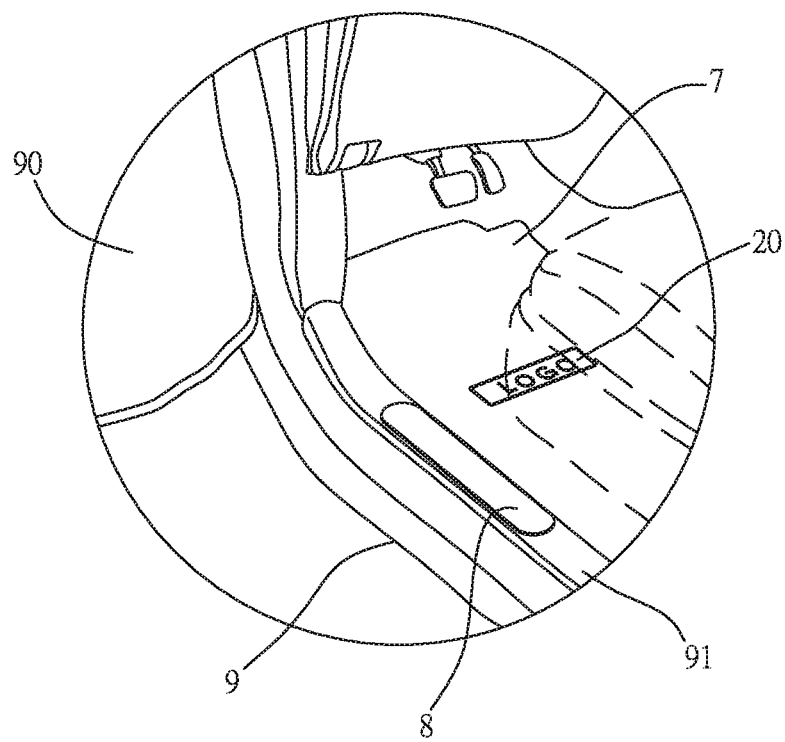
FIG. 12 is a schematic view of the implementation of the first embodiment of the wireless smart mat of the present invention.

Through the design of the structure of the present invention, as shown in FIG. 12, when the vehicle door 90 of the vehicle 9 is opened, at this time, the sensing module 80 of the transmitting end 8 detects that the vehicle door 90 is opened and detects the sensing signal, and transmits the sensing signal to the second control module 82. The second control module 82 generates the control signal according to the sensing signal and transmits the control signal to the second wireless transmission and receiving module 81. Then the second wireless transmission and receiving module 81 transmits the control signal to the first wireless transmission and receiving module 25 of the display mat unit 20. The first wireless transmission and receiving module 25 receives the control signal and then transmits the control signal to the first control module 27, and the first control module 27 turns on the backlight module 22 according to the control signal. Therefore, through the present invention, the wireless smart mat 2 can automatically turn on the backlight module 22 when the vehicle door 90 is opened, and turn off the backlight module 22 when the vehicle door 90 is closed. In this way, drawbacks and problems of complicated installation and safety concerns caused by the conventional foot mat and transmitting end must be electrical connected to the vehicle power supply through wires are eliminated. The present invention replaces the conventional way of wire connection with the first wireless transmission and receiving module 25 of the wireless smart mat 2 and the second wireless transmission and receiving module 81 of the transmitting end 8, thereby greatly improving safety and installation convenience, and further achieving the effect of thin design.

In addition, through the gravity sensing module 26 in the display mat unit 20, when the vehicle 9 is in a stationary state for a long time, the acceleration change detected by the gravity sensing module 26 is 0, and the first control module 27 turns off the backlight module 22 and the first wireless transmission and receiving module 25 according to the voltage signal sent by the gravity sensing module 26, so that the wireless smart mat 2 is in a power saving mode when the vehicle 9 is in a stationary state, and only the gravity sensing module 26 is turned on to detect the behavior state of the vehicle 9.

In addition, when the vehicle 9 is in a driven state, the acceleration change detected by the gravity sensing module 26 is greater than 0, and the first control module 27 turns off the backlight module 22 and the first wireless transmission and receiving module 25 according to the voltage signal sent by the gravity sensing module 26, so that the wireless smart mat 2 is in a sleep mode when the vehicle 9 is in a driven state, and only the gravity sensing module 26 is turned on to detect the behavior state of the vehicle 9.

When the vehicle door 90 of the vehicle 9 is opened or closed, the acceleration sensed by the gravity sensing module 26 is changed from 0 to greater than 0 (i.e. the gravity sensing module 26 is from a stationary state to a vibration state), and the voltage signal sent by the gravity sensing module 26 is transmitted to the first control module 27. The first control module 27 controls the first transmission and receiving module 25 according to the voltage signal to turn on for a period of time to receive the control signal of the transmitting end 8. At this time, the backlight module 22 can be turned on according to the control signal, and thus the unnecessary modules can be turned off by the wireless smart mat 2 regardless of the vehicle 9 in a stationary state or in a driven state, so that the unnecessary modules (the backlight module 22, the first transmission and receiving module 25) generate a power saving mode or a sleep mode, thereby achieving a significant energy-saving effect.

Figure 13:
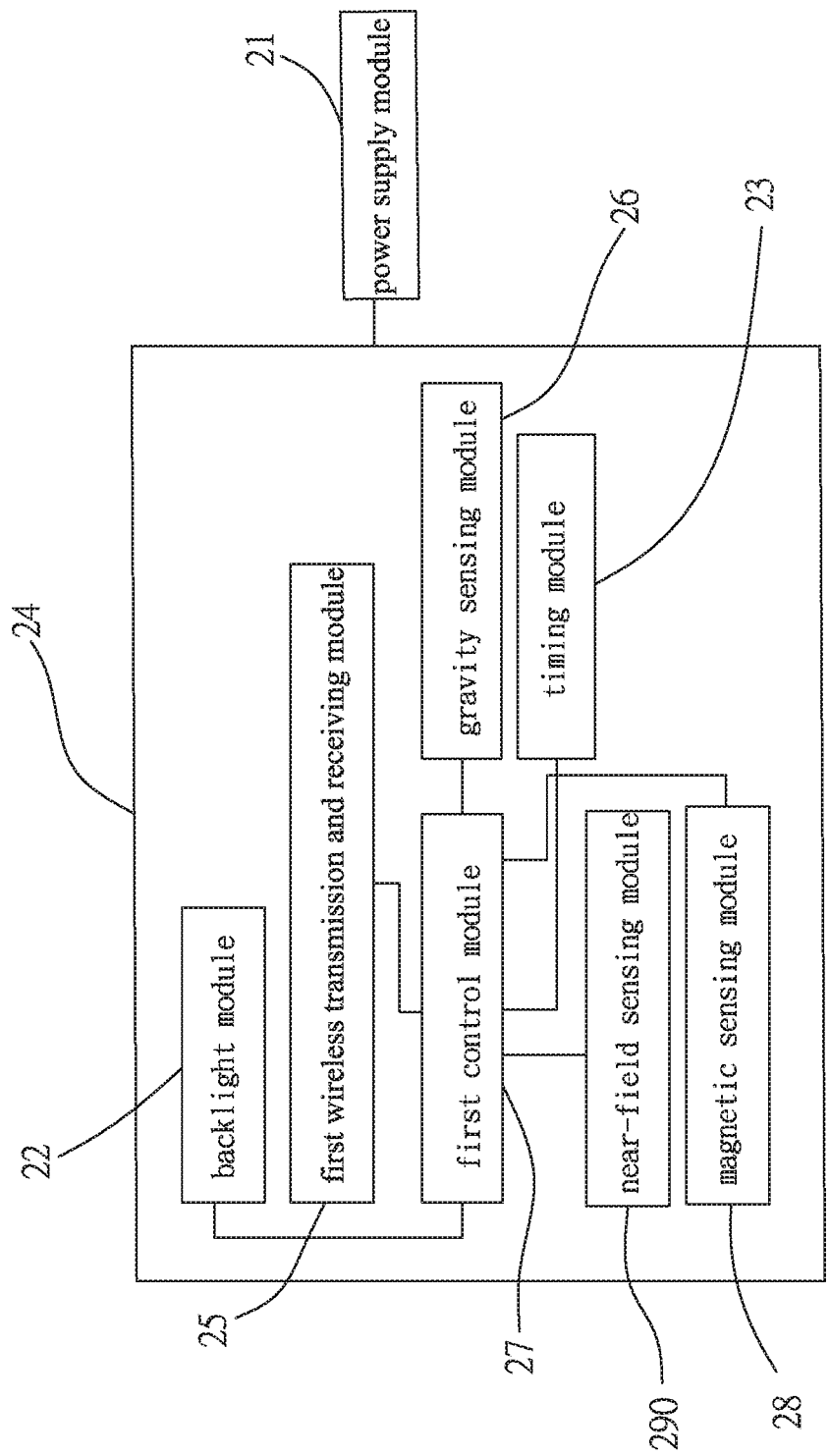
FIG. 13 is a block diagram of a third embodiment of the wireless smart mat of the present invention.

Continuing to refer to FIG. 13 and FIG. 1 and FIG. 12 as well. FIG. 13 is a block diagram of a third embodiment of the wireless smart mat of the present invention. Corresponding relationships between the components of the wireless smart mat 2 are the same as those of the wireless smart mat 2 described above, so they will not be described here again. However, the main differences between the wireless smart mat 2 and the foregoing are that the display mat unit 20 further has a timing module 23, and the timing module 23 is disposed on the circuit board 24 and electrically connected to the first control module 27 and the backlight module 22. When the vehicle door 90 of the vehicle 9 is opened for a long time, the backlight module 22 can be automatically turned off through the timing module 23 to achieve a better power saving effect.

Figure 14:
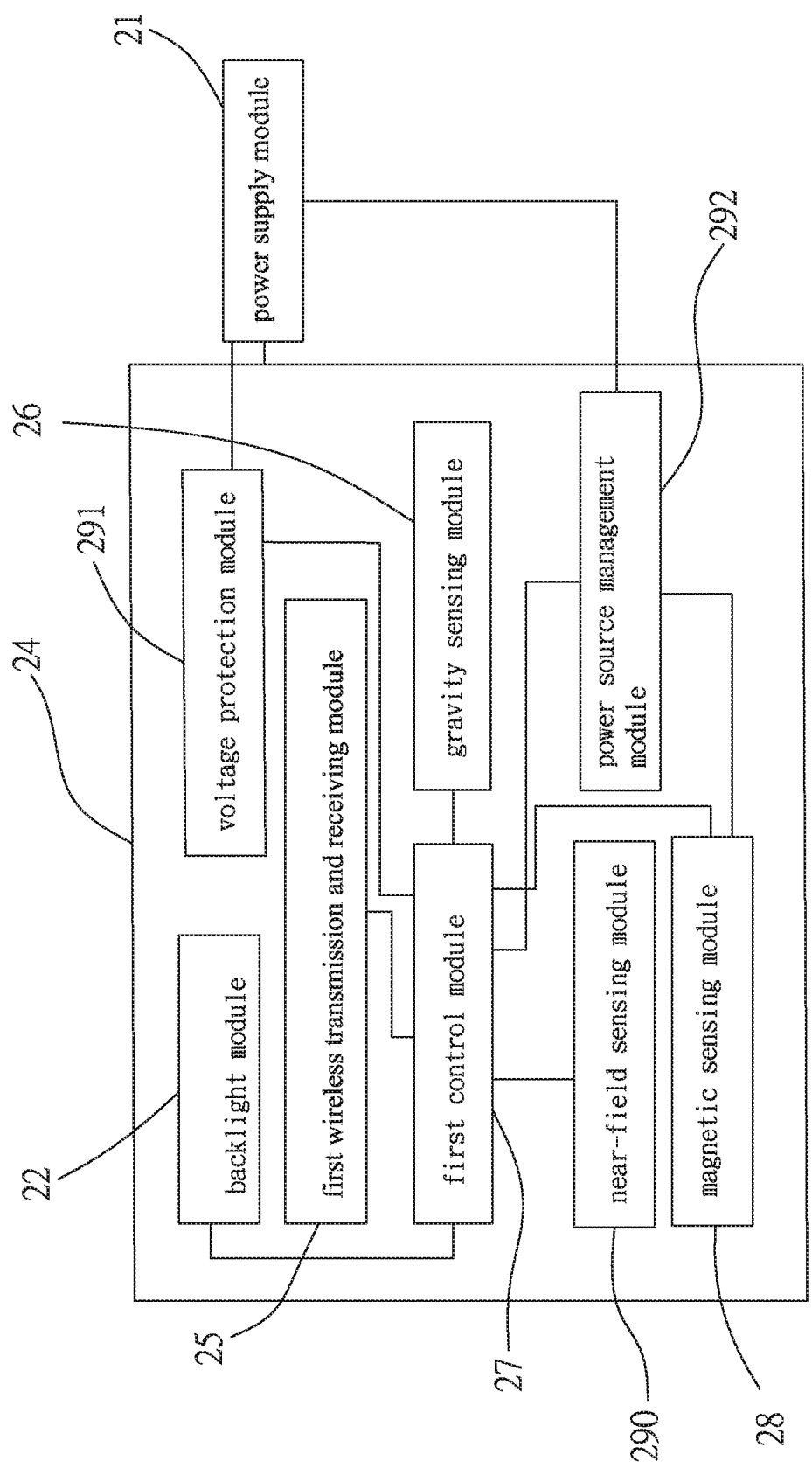
FIG. 14 is a block diagram of a fourth embodiment of the wireless smart mat of the present invention.

Please refer to FIG. 14 and FIG. 1 as well. FIG. 14 is a block diagram of a fourth embodiment of the wireless smart mat of the present invention. Corresponding relationships between the components of the wireless smart mat 2 are the same as those of the wireless smart mat 2 described above, so they will not be described here again. However, the main differences between the wireless smart mat 2 and the foregoing are that the display mat unit 20 further has a voltage protection module 291 electrically connected to the first control module 27 and the power supply module 21. The voltage protection module 291 is a short circuit prevention mechanism used to prevent the circuit board 24 from being damaged due to the reverse installation of the power supply module 21 or short circuit, thereby preventing damage of the circuit board 24 caused by short circuit. In addition, the display mat unit 20 further has a power source management module 292 electrically connected to the first control module 27 and the power supply module 21. The first control module 27 performs an on or off command to the magnetic sensing module 28 through the power source management module 292. In other words, if the magnetic sensing module 28 is not in operation, it will automatically turn off to achieve a power saving mode.

As described above, the present invention has the following advantages as compared with the prior art:
1. Greatly improve safety;
2. Enhance convenience of installation;
3. Achieve the effect of thin design; and
4. Has the effect of energy-saving.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A wireless smart mat, receiving a sensing signal detected by a transmitting end, the wireless smart mat comprising:
   a display mat unit, comprising:
      a frame, one side of the frame having a recess, an accommodating portion being correspondingly disposed in the recess, and the accommodating portion being accommodated with a power supply module and a magnetic element;
      a backlight module correspondingly accommodated in the recess, the backlight module comprising at least one circuit board electrically connected to the power supply module, and the circuit board being provided with a plurality of light-emitting members;
      at least one magnetic sensing module correspondingly disposed on the circuit board, and the magnetic sensing module being set in a alternating manner with the magnetic element;
      a first wireless transmission and receiving module disposed on the circuit board for receiving the sensing signal of the transmitting end;
      a gravity sensing module disposed on the circuit board for detecting a change in acceleration and generating a voltage signal;
      a first control module disposed on the circuit board and electrically connected to the backlight module, the magnetic sensing module, the first wireless transmission and receiving module, and the gravity sensing module, and the first control module turning on and turning off the backlight module according to the sensing signal and the voltage signal;
      a panel accommodated in the recess and correspondingly disposed above the backlight module; and
      a bottom plate assembled on another side of the frame and correspondingly covered on the accommodating portion; and
   a foot mat having a receiving portion, and the display mat unit being correspondingly installed in the receiving portion.

2. The wireless smart mat as claimed in claim 1, wherein the transmitting end further has a sensing module, a second wireless transmission and receiving module, and a second control module, the sensing module is used for detecting the sensing signal and transmitting the sensing signal to the second control module, and the second control module generates a control signal according to the sensing signal and transmits the control signal to the second wireless transmission and receiving module.

3. The wireless smart mat as claimed in claim 2, wherein after the control signal is transmitted to the second wireless transmission and receiving module, the second wireless transmission and receiving module transmits the control signal to the first wireless transmission and receiving module.

4. The wireless smart mat as claimed in claim 2, wherein the sensing module is selected as a magnetic proximity switch or a capacitive proximity switch.

5. The wireless smart mat as claimed in claim 1, wherein the light-emitting member is selected as a light-emitting diode or an organic light-emitting diode.

6. The wireless smart mat as claimed in claim 1, further comprising a waterproof ring, and the waterproof ring being installed at a circumferential side of the accommodating portion to achieve waterproof effect.

7. The wireless smart mat as claimed in claim 1, wherein a light-transmitting portion is further formed on the panel, and the light-transmitting portion is correspondingly disposed on the backlight module for light to transmit through.

8. The wireless smart mat as claimed in claim 2, wherein the first and second control modules are selected as a microcontroller (MCU) or an integrated circuit (IC).

9. The wireless smart mat as claimed in claim 1, wherein the display mat unit further has a timing module disposed on the circuit board and electrically connected to the first control module and the backlight module, and the timing module is used for automatically turning off the backlight module to save electric power.

10. The wireless smart mat as claimed in claim 1, wherein when the acceleration change detected by the gravity sensing module is equal to 0, the first control module turns off the backlight module and the first wireless transmission and receiving module according to the voltage signal, and at this time the wireless smart mat is in a power saving mode; when the acceleration change detected by the gravity sensing module is greater than 0, the first control module turns off the backlight module and the first wireless transmission and receiving module according to the voltage signal, and at this time the wireless smart mat is in a sleep mode.

11. The wireless smart mat as claimed in claim 1, wherein the foot mat is correspondingly installed on a bottom of a vehicle, and the transmitting end can be disposed in a welcome pedal, or on a door of the vehicle, or on a door frame of the vehicle.

12. The wireless smart mat as claimed in claim 1, wherein the frame is further formed with a slot for communicating with the recess, and the slot is used for accommodating the magnetic element.

13. The wireless smart mat as claimed in claim 12, wherein the frame is further disposed with an iron plate corresponding to a lower side of the slot, and the iron plate is disposed corresponding to the magnetic element.

14. The wireless smart mat as claimed in claim 1, wherein the display mat unit further has a near-field sensing module correspondingly disposed on the circuit board and electrically connected to the first control module, and the near-field sensing module is used to perform a near-field sensing procedure to sense a near-field distance between the transmitting end and the foot mat to generate a near-field sensing signal.

15. The wireless smart mat as claimed in claim 14, wherein the first control module can further perform an interference procedure of noise mitigation to reduce noise in the near-field sensing signal.

16. The wireless smart mat as claimed in claim 15, wherein the first control module further comprises an analog-to-digital converter, a median filter, and a slope limiter, the median filter and the slope limiter are coupled to the analog-to-digital converter, the analog-to-digital converter is used for converting the near-field sensing signal into a digital near-field sensing signal, the median filter is used for performing a median filtering operation on the digital near-field sensing signal to filter out a surge noise in the digital near-field sensing signal, the slope limiter is used for performing a slope limiting operation on the digital near-field sensing signal to filter out a drastic noise in the digital near-field sensing signal, the first control module generates an operation signal according to results of the median filtering operation and the slope limiting operation, and the interference procedure of noise mitigation comprises the median filtering operation and the slope limiting operation.

17. The wireless smart mat as claimed in claim 16, wherein the first control module further comprises a low-pass filter for performing a low-pass filtering operation on the operation signal to generate a low-pass filter signal.

18. The wireless smart mat as claimed in claim 17, wherein the low-pass filtering operation comprises a self-learning procedure, wherein the low-pass filter performs the self-learning procedure on the operation signal to achieve low-pass filtering of the operation signal to generate the low-pass filter signal, wherein the self-learning procedure comprises the following steps of:

(A) calculating an initial average value of the operation signal;
(B) comparing the operation signal with the initial average value;
(C) when the operation signal is not less than the initial average value, increasing the initial average value to generate the low-pass filter signal;
(D) when the operation signal is less than the initial average value, reducing the initial average value to generate the low-pass filter signal;
(E) comparing the operation signal with the low-pass filter signal;
(F) when the operation signal is not less than the low-pass filter signal, increasing the low-pass filter signal to generate the new low-pass filter signal;
(G) when the operation signal is less than the low-pass filter signal, reducing the low-pass filter signal to generate the new low-pass filter signal; and
(H) repeating the step (E).

19. The wireless smart mat as claimed in claim 1, wherein the display mat unit further has a voltage protection module electrically connected to the first control module and the power supply module, and the voltage protection module is used to prevent the circuit board from being damaged due to short circuit.

20. The wireless smart mat as claimed in claim 19, wherein the display mat unit further has a power source management module electrically connected to the first control module and the power supply module, and the first control module achieves a power saving mode for the magnetic sensing module through the power source management module.

* * * * *